(12) United States Patent
Hivert

(10) Patent No.: US 11,473,011 B2
(45) Date of Patent: Oct. 18, 2022

(54) COLOURED LUMINESCENT PIGMENT, METHOD FOR THE PRODUCTION THEREOF AND USES OF SAME

(71) Applicant: CHRYSO, Issy les Moulineau (FR)

(72) Inventor: Jean-Jacques Hivert, Mareau aux Bois (FR)

(73) Assignee: CHRYSO, Issy les Moulineaux (FR)

( * ) Notice: Subject to any disclaimer, the term of this patent is extended or adjusted under 35 U.S.C. 154(b) by 495 days.

(21) Appl. No.: 15/761,529

(22) PCT Filed: Sep. 30, 2016

(86) PCT No.: PCT/EP2016/073396
§ 371 (c)(1),
(2) Date: Mar. 20, 2018

(87) PCT Pub. No.: WO2017/055531
PCT Pub. Date: Apr. 6, 2017

(65) Prior Publication Data
US 2018/0346806 A1 Dec. 6, 2018

(30) Foreign Application Priority Data
Sep. 30, 2015 (FR) ...................................... 1559270

(51) Int. Cl.
| | | |
|---|---|---|
| *C09K 11/02* | (2006.01) | |
| *C09D 5/22* | (2006.01) | |
| *C09K 11/77* | (2006.01) | |
| *C09K 11/08* | (2006.01) | |
| *C04B 14/30* | (2006.01) | |
| *C04B 111/80* | (2006.01) | |
| *C04B 111/82* | (2006.01) | |
| *C08K 3/013* | (2018.01) | |

(52) U.S. Cl.
CPC .......... *C09K 11/025* (2013.01); *C04B 14/303* (2013.01); *C09D 5/22* (2013.01); *C09K 11/08* (2013.01); *C09K 11/7792* (2013.01); *C04B 2111/807* (2013.01); *C04B 2111/82* (2013.01); *C08K 3/013* (2018.01)

(58) Field of Classification Search
CPC ... C09K 11/025; C09K 11/08; C09K 11/7792; C09D 5/22
See application file for complete search history.

(56) References Cited

U.S. PATENT DOCUMENTS

| | | | | |
|---|---|---|---|---|
| 3,950,180 A | * | 4/1976 | Kato | ....................... C09B 69/02 |
| | | | | 106/468 |
| 4,297,390 A | | 10/1981 | Franz et al. | |
| 4,339,501 A | | 7/1982 | Inoue et al. | |
| 6,362,274 B1 | | 3/2002 | Legrand et al. | |
| 6,989,190 B2 | * | 1/2006 | Gaggar | ................... C08L 67/02 |
| | | | | 428/220 |
| 2005/0035331 A1 | | 2/2005 | Sun | |
| 2005/0009642 A1 | | 5/2005 | Delp et al. | |
| 2005/0096420 A1 | * | 5/2005 | Delp | ........................ C08K 3/22 |
| | | | | 524/430 |
| 2007/0033747 A1 | * | 2/2007 | Chianelli | .................. C09B 7/04 |
| | | | | 8/498 |
| 2012/0156151 A1 | * | 6/2012 | Indig | ........................ C09C 1/42 |
| | | | | 424/63 |

FOREIGN PATENT DOCUMENTS

| | | |
|---|---|---|
| EP | 0 877 765 B1 | 11/1998 |
| EP | 1 184 426 A2 | 3/2002 |
| EP | 0 013 410 A1 | 11/2010 |
| FR | 2 168 685 A5 | 8/1973 |
| FR | 2 990 204 A1 | 11/2013 |
| JP | 2012040596 A | 3/2012 |
| WO | 2009/053391 A2 | 4/2009 |
| WO | 2010/134805 A1 | 11/2010 |

OTHER PUBLICATIONS

International Search Report, dated Dec. 7, 2016, from corresponding PCT/EP2016/073396 application.
FR Search Report, dated Jun. 17, 2016, from corresponding FR 1559270 application.

* cited by examiner

*Primary Examiner* — Edward J Cain
(74) *Attorney, Agent, or Firm* — Nixon & Vanderhye

(57) ABSTRACT

Disclosed is a colored luminescent composite pigment including an association of at least one luminescent pigment having an average particle size of between 50 and 2000 μm and at least one coloring agent. Also disclosed are compositions and materials including the pigment, to the method for the production thereof and to the use of same for coloring materials, particularly of a hydraulic binder composition.

20 Claims, 2 Drawing Sheets

COLOURED LUMINESCENT PIGMENT, METHOD FOR THE PRODUCTION THEREOF AND USES OF SAME

The present invention relates to colored luminescent pigments, methods for their preparation, compositions comprising them, coatings comprising them, and their uses, in particular in hydraulic binder compositions.

The introduction of luminescent pigments in materials, in order to provide visibility in low light or zero brightness (night, shade, darkness, interior unlit due to an electrical failure . . . ), is sought. The object is to provide good visibility over a long period, typically over several hours. This is of particular interest for applications of the signaling type, for example vertical or horizontal; extra lighting, improvement of the aesthetics of a material, for example graphic visualization, decoration . . . .

However, it may be desired to choose the color of the material when the material is in the light, or when the material is in a low light or zero brightness location, typically for interior lighting of less than 100 lx or 10 lx or even less than 1 lx. For example, it may be desired to have a different color when the material is in the light, and when the material is in a low light or zero brightness location. It is therefore necessary to provide a pigment or a pigment composition combining at least one luminescent pigment and at least one so-called conventional dye.

Many technologies have been developed in this direction.

In particular, JP201240596 discloses the application of at least two successive coatings on the material. A first layer, in contact with the material, comprising a luminescent pigment and a second layer, is deposited on top of the first layer, comprising a conventional dye. However, this technology requires the application of different coatings, that makes it time consuming and economically unprofitable. In addition, there may be adhesion problems for the different coatings.

An alternative technology proposes to introduce, in the same essentially transparent matrix, in particular plastic matrix, glass . . . , the luminescent pigment and the dye. This technology is described, in particular, in US20050096420. However, as the luminescent pigment and the dye are dispersed independently, the effect of the dye is not very effective and so requires a high dosage.

In an attempt to overcome this problem, it has been proposed to associate the luminescent pigment and the dye more intimately. In particular, US20050035331 describes the combination of a luminescent pigment with a highly reflective material such as titanium dioxide. However, the effect sought was to enhance the luminescence and not to combine the luminescence with a color in light. The association between a phosphorescent pigment A and a dye B is also described in WO2009053391, wherein the size of the pigments A are between 0.5 and 25 µm, while the size of the dyes B is less than 0.2 µm. However, the remanence time obtained is only a few seconds, and this technology requires a high content of dye B to influence the effectiveness of the system because this dye B will absorb the light used to charge the phosphorescent pigment A and also that emitted by pigment A in the dark.

The present invention aims, in particular, the treatment of a composition based on hydraulic binder and, in particular, concretes. This particular application may introduce an additional constraint due to the alkaline pH of the hydraulic binder compositions. The introduction of luminescent pigments into concretes is already disclosed, in particular in FR2168685, FR2990204 and WO2010134805. However, these documents do not disclose the possibility of introducing a particular dye to select and control the color of concrete in light or low light or zero brightness conditions.

There is, therefore, an interest in providing a colored luminescent pigment, which may be used, in particular, in the mass of the material, which makes it possible to control coloration of the material in light and that obtained by luminescence in low light or in the absence of luminosity, without significantly impairing the effectiveness of the luminescent effect of the luminescent pigment alone.

An object of the present invention is to provide a colored luminescent pigment, in particular that is usable in the mass of the material, which allows the control of coloration of the material in light and through luminescence in low light or in the absence of luminosity.

Another object of the present invention is to provide a method for the preparation of such a pigment.

The present invention also aims to provide compositions comprising a colored luminescent pigment.

Still another object of the present invention is to provide a material, for example paint, hydraulic binder composition, comprising the colored luminescent pigment or the composition comprising the colored luminescent pigment.

Other objectives will become apparent upon reading the description of the invention which follows.

In order to overcome the disadvantages of the prior art mentioned above, the present invention provides a colored luminescent composite pigment comprising at least one luminescent pigment and at least one dye, wherein the composite pigment has an average particle size of between about 50 and about 2000 µm.

The composite pigment of the present invention may also be defined as a colored luminescent composite pigment comprising, in combination, at least one luminescent pigment and at least one dye, and having an average particle size of from about 50 to about 2000 µm.

Preferably, the colored luminescent composite pigment according to the present invention (or colored luminescent pigment or composite pigment or luminescent composite pigment) has an average particle size of between about 60 and about 2000 µm, preferably between about 60 and about 500 µm, for example between about 75 and about 200 µm.

In the context of the present invention, the term "luminescent pigment" is understood to mean any compound capable of absorbing photons emitted by natural or artificial light and rendering a light emission in the event of reduced brightness or in the absence of luminosity. Luminescence includes phosphorescence and fluorescence. Preferably, in the context of the present invention, the luminescent pigment is a photoluminescent pigment.

The luminescent pigment will be chosen as a function of the color that is desired in reduced brightness or in the absence of brightness.

Preferably, the luminescent pigment will be chosen to have a remanence of several hours after exposure to natural or artificial light.

In general, the luminescent pigment may be organic or inorganic, wherein mineral pigments are preferred because of their greater durability, especially in the open air.

The organic luminescent pigments are chosen, in particular, from among naphthalimides, coumarins, xanthenes, thioxanthenes, naphtholactams, azlactones, methines, oxazines and thiazines, or their mixture.

The inorganic luminescent pigments are chosen, in particular, from among:

sulphides, for example CaS: Bi, CaSrS: Bi, ZnS: Cu, ZnS: $Pb^{2+}$, ZnS: $Mn^{2+}$, ZnCdS:Cu, $AB_2S_4$ (where A=alkaline earth metal, B=aluminum), ZnS, ZnS:Ag, ZnS:Cu:Cl, ZnS:Cu:Al, $(Ce_3(SiS_4)2X$ (where X=Cl, Br, I), $La_{3-x}Ce_x(SiS_4)_2I$ (where), SrS:Cr, SrS doped with rare earths where Mn, CdS: Mn, $Y_2O_2S$: (Er, Yb); fluorides, such as, for example, $AF_3$ (where A=$La^{3+}$, $Ce^{3+}$, $Y^{3+}$) and AF2 ($Al^{3+}$, Mg2+, Ca2+, Pb2+) and containing at least one luminescent ion selected from the group comprising trivalent metal ions (Cr3+, Fe3+, etc.) or rare earths ($Y^{3+}$, $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$), $LnF_3$, $ALnF_4$, $ALn_2F_8$, $ALn_3F_{10}$ (where Ln=rare earth or yttrium, A ion monovalent alkali, and containing at least one luminescent ion selected from the group consisting of trivalent metal ions ($Cr^{3+}$, $Fe^{3+}$, etc.) or rare earths ($Y^{3+}$, $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$), $EF_3$ (E=$Ga^{3+}$, $In^{3+}$, $Bi^{3+}$ and containing at least one luminescent ion selected from the group consisting of trivalent metal ions ($Cr^{3+}$, $Fe^{3+}$, etc.) or rare earths ($Y^{3+}$, $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$), $Sr_{1-x}Eu^{2+}_xSiF_6.2H_2O$ (where 0<x≤0.5), $M_{1-x}Eu_x^{2+}SiF_6$ (where 0<x≤0.2 and M is chosen especially from calcium and barium), $K_2YF_5$ (doped with $Gd^{3+}$, $Tb^{3+}$, $Eu^{3+}$ or $Pr^{3+}$), $LiYF_4$ (doped with $Gd^{3+}$, $Tb^{3+}$, $Eu^{3+}$ or $Pr^{3+}$), $NaLnF_4$ (where Ln=lanthanide or Y), $NaYF_4:Pr^{3+}$, $Na(Y,Yb)F_4:Pr^{3+}$, $Na_3AlF_6$ containing at least one luminescent ion selected from the group consisting of trivalent ($Cr^{3+}$, $Fe^{3+}$, etc.) or rare earth ($Y^{3+}$, $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, $Yb^{3+}$), $BaLiF_3:Eu^{3+}$, $BaY_2F_8:Eu^{3+}$, $BaSiF_6:Eu^{3+}$, [alpha]-$NaYF_4:Pr^{3+}$ or $LiGdF_4:Eu^{3+}$;

luminescent oxides, for example $MAl_2O_4$ (where M=one or more metals chosen from calcium, strontium and barium), the oxide which may be doped with europium as a luminescence activator and which may optionally contain other activators, such as for example lanthanum, cerium, praseodymium, neodymium, samarium, gadolinium, dysprosium, holmium, erbium, thulium, ytterbium, lutetium or tin and bismuth as coactivators as in $SrAl_2O_4(Eu^{2+},Dy^{3+})$, $(M'_xM''_y)Al_2O_4$ (where x+y=1 et M' and M" are different and selected from calcium, strontium and barium, oxide which may be doped with europium as an activator and which may optionally contain other activators, such as, for example, lanthanum, cerium, praseodymium, neodymium, samarium, gadolinium, dysprosium, holmium, erbium, thulium, ytterbium, lutetium or tin and bismuth as coactivators, $M_{1-x}Al_2O_{4-x}$ (where M is at least one metal selected from calcium, strontium and barium or in which M comprises magnesium and at least one metal selected from calcium, strontium and barium, where x is non-zero and preferably between −0.3 and 0.6, wherein the oxide may be doped with europium as an activator and may optionally contain other activators such as for example lanthanum, cerium, praseodymium, neodymium, samarium, gadolinium, dysprosium, holmium, erbium, thulium, ytterbium, lutetium or tin and bismuth as coactivators, $LnBO_3$ where Ln=at least one rare earth, $M_4Al_{14}O_{25}$ where M=one or more metals selected from calcium, strontium and barium, wherein the oxide may be doped with europium as an activator and may optionally contain other activators such as lanthanum, cerium, praseodymium, neodymium, samarium, gadolinium, dysprosium, holmium, erbium, thulium, ytterbium, lutetium or tin and bismuth as coactivators); $Sr_4Al_{15}O_{25}$; $M(II)_{1-x}Eu(II)_xM(III)_pEu(III)_qTb(III)_rB_9O_{16}$; where M (II) is at least one bivalent metal selected from barium, strontium, lead and calcium, M (III) is selected from lanthanum, gadolinium, yttrium, cerium, lutetium and bismuth, 0≤x≤0.2, p, q and r are non-zero, strictly between −1 and 1 such that p+q+r=1, $Ln_{1-x}Tb_xMgB_5O_{10}$ where Ln=rare earth or yttrium and 0<x≤1, $M_{5(1-a)}Eu_{5a}^{2+}Si_4X_6$ where M=$Ba_{1-b}Sr_b$, 0≤b≤0.1, 0≤a≤0.2 and X=$Cl_{1-c}Br_c$ where 0≤c≤1, $La_{1-x}Sm_xOBr$ (where 0<x≤0.1), ZnO:Zn, ZnO:$Ga_2O_3$:Bi, $CaTiO_3:Pr^{3+}$, $La_2TiO_5:Pr^{3+}$, $La_2Ti_2O_7:Pr^{3+}$, $(La,Pr)_2Ti_2O_7$, $(La,Yb,Pr)_2Ti_2O_7$, $YBO_3:(Eu^{3+}, Tb^{3+}, Gd^{3+})$, $Y_3BO_6:Eu^{3+}$, $LnBO_3$ (doped with $Eu^{3+}$, $Tb^{3+}$, $Pr^{3+}$ or $Tm^{3+}$, doped or co-doped with $Ce^{3+}$ or $Gd^{3+}$ and $Eu^{3+}$, $Tb^{3+}$, $Pr^{3+}$, $Tm^{3+}$ or $Pr^{3+}$), $Ln_3BO_6$ (doped with $Eu^{3+}$, $Tb^{3+}$, $Pr^{3+}$ or $Tm^{3+}$, doped or co-doped with $Ce^{3+}$ or $Gd^{3+}$ and $Eu^{3+}$, $Tb^{3+}$, $Pr^{3+}$, $Tm^{3+}$ or $Pr^{3+}$), $Ln(BO_2)_3$ (doped with $Eu^{3+}$, $Tb^{3+}$, $Pr^{3+}$ or $Tm^{3+}$, doped or co-doped with $Ce^{3+}$ or $Gd^{3+}$ and $Eu^{3+}$, $Tb^{3+}$, $Pr^{3+}$, $Tm^{3+}$ or $Pr^{3+}$), $SiO_2$ (doped with rare earths), $SiO_2:(Sm^{3+},Al^{3+})$, $Al_{(2-x-y)}(Y,Ln)_xO_3:yM$ (where M=$Cr_2O_3$, $V_2O_5$, NiO, $WO_3$, CuO, FeO, $Fe_2O_3$ et Ln=Er, La, Yb, Sm, Gd and mixtures thereof and 0.48≤x<≤1.51 and 0.007≤y≤0.2), $Al_2O_3$ (doped with rare earths), glasses of phosphate (doped with rare earths), $LiNbO_3$ (doped with rare earths), $TiO_2$ (doped with rare earths), $LaPO_4$:Ce and/or Tb, $LaPO_4$:Eu, $CePO_4$:Tb, $MAl_2B_2O_7:Eu^{2+}$ (where M=Sr, Ca), $M_2B_5O_9X$:Eu (where M=Ca, Sr, Ba et X=Cl, Br), $CaSO_4$:Eu, $CaSO_4$:Eu, $LaMgB_5O_{10}$:Ce where Mn, $Y_2O_3$: Eu, $Gd_2O_3$:Eu, $(Y_{0.7}Gd_{0.3})_2O_3$:Eu, $CoAl_2O_4$, $Mg_4GeO_5.5F$:Mn, $(Sr,Mg)_3(PO_4)_2$:Sn, $Y3Al5O12$:Ce, $BaMgAl_{10}O_{17}$:Eu, $BaMg_2Al_{16}O_{27}$:Eu, (Ce,Tb)$MgAl_{11}O_{19}$, (Ce,Gd,Tb)$MgB_5O_{10}$, (Ce,Gd,Tb)$MgB_5O_{10}$:Mn, $LaPO_4$:(Ce,Tb), $Sr_2Al_{14}O_{25}$:Eu, $Ca_5(PO_4)_3(F,Cl)$: (Sb,Mn), $(La,Ce,Tb)(PO_4)_3$: (Ce,Tb), $CeO_{0.65}TbO_{0.35}MgAl_{11}O_{19}$, barium-titanium phosphates, $(Ba,Sr,Ca)_2SiO_4$:Eu, $SrAl_{12}O_{19}$:Ce, $BaSi_2O_5$:Pb, $(Sr,Zn)MgSi_2O_7$:Pb, $SrB_4O_7$: Eu, $(Gd,La)B_3O_6$:Bi, $Sr_2P_2O_7$: Eu, $BaMgAl_{10}O_{17}$:Eu, Mn, $Zn_2SiO_4$:Mn, $YVO_4$:(Eu,Sm,Dy), $AWO_4$ (where A=Ca, Ba, Pb, Cd, Zn, Mg), $In_2O_3$:(Er,Tb), $GdAl(BO_3)_4$:Nd, $ZrO_2:Eu^{3+}$, $GdVO_4$:(Bi,Eu);

red phosphorus; and the nitrites of alkali or alkaline earth metals.

Preferably, the luminescent pigment is chosen from among zinc sulphide and strontium or calcium aluminates doped with rare earths, or mixtures thereof. Preferably, the luminescent pigment is chosen from among zinc sulphide and rare earth-doped strontium aluminates.

Preferably, the luminescent pigments according to the present invention are not covered with a protective layer, i.e. they have not been covered with a polymeric matrix (for example polyethylene), wax . . . to protect them, in particular, from external aggressions, especially to protect them from reactions to water. In fact, as has been shown by the inventors, if pretreated luminescent pigments coated with a protective layer are used in the invention, when the composite pigment obtained is washed with water, the water is found to be colored the color of the dye, thus highlighting the leaching of the dye. This also makes it possible to show that there is indeed an intimate association between the luminescent pigment and the dye in the composite pigment of the invention. Preferably, the luminescent pigment has an average particle size of between about 60 and about 2000 μm, preferably between about 60 and 500 μm, for example between about 75 and about 200 μm.

Preferably, the luminescent pigment particles are porous and have a percentage of pores by volume, especially measured by mercury porosity according to ISO15901-1: 2005, of between 1 and 90%, preferably between about 2 and about 50%.

In the context of the present invention, the term "dye" is understood to mean a substance, or a mixture of substances, which makes it possible, when a dye is used in a material, to give a color to this material by absorbing or reflecting specific wavelength radiation. This substance or mixture may be soluble or insoluble in the material in question.

In the context of the present invention, the dye will make it possible to fix the color of the material in light, in particular in daylight. The dye will be chosen according to the color desired, and it is also possible to use dye mixtures. The dye may be organic or inorganic in nature. The dye may, in particular, be in the form of a powder or a powder in suspension.

The organic dyes may, in particular, be chosen from among compounds based on nitroso (compound comprising an NO group), nitro (compound comprising an $NO_2$ group), azo (compound comprising an HN=NH group), xanthene, quinoline, anthraquinone, phthalocyanine, complex type metal, isoindolinone, isoindoline, quinacridone, perinone, perylene, diketopyrrolopyrrole, thioindigo, dioxazine, triphenylmethane, quinophthalone. These dyes are known to persons skilled in the art. These dyes may also be in the form of composite dyes as described for example in EP 1 184 426, that is incorporated herein by reference. This composite dye may be composed, in particular, of particles comprising an inorganic core, at least one binder for fixing the organic dyes on the core, and at least one organic dye at least partially covering the core. The dye may also be a special effects dye. Special effects dyes are dyes which generally create a colored appearance (characterized by a certain shade, a certain vibrancy and a certain clarity) which is non-uniform and changeable according to the conditions of observation (light, temperature, observation angles . . . ). They are therefore opposed to white or colored dyes that provide a uniform opaque, semi-transparent or conventional transparent tint. As special effect pigments, mention may be made of pearlescent pigments such as white pearlescent pigments such as titanium mica, or mica-bismuth oxychloride, colored pearlescent pigments such as titanium mica with iron oxides, mica titanium with, in particular, ferric blue or chromium oxide, titanium mica with an organic pigment of the aforementioned type as well as pearlescent pigments based on bismuth oxychloride.

As inorganic dyes, mention may be made of titanium oxides such as anatase and rutile, the various iron oxides (yellow, red, brown, etc.), chromium oxides, barium oxides, cadmium oxides, nickel oxides, copper oxides, cobalt oxides, zinc oxides, cobalt stannate, cobalt alum inates, quartz powder, talc, carbon black, calcium carbonate and barite.

The dye may also be a fluorescent dye (or brightener). Such fluorescent dyes may be of interest, especially for security displays. The effect of the dye may be enhanced by combination with an optical brightener for example. This brightener (or combination of brighteners) may, for example, be chosen from stilbene derivatives. The addition of a fluorescent dye (or an optical brightener) advantageously also makes it possible to modulate the night color of the luminescent pigment.

Preferably, the dye is chosen from among oxides of iron, barium, chromium, cadmium, zinc, cobalt, nickel and titanium and carbon black.

Preferably, in the context of the present invention, for insoluble dyes, the size of the dye particles is smaller than the size of the luminescent pigment particles. Preferably, the average size of the dye particles is at least 10 times smaller than that of the luminescent pigment. Preferably, the dye has an average particle size of from about 0.1 to about 10 μm.

In the context of the present invention, the "mean size" of the particles or aggregates is understood to mean the mean diameter of the particles. This size may be measured in terms of volume by laser granulometry for particles having a size of less than or equal to 500 μm (ISO 13320:2009 standard) or by weight by sieving for particles having a size greater than 500 μm (measured according to the standard NF EN 933-1 of May 2012).

The expression "control of the coloring with light and control of the luminescence in low light or in the absence of luminosity" is understood to mean having a homogeneous color in light and having a homogeneous color by luminescence under low illumination (or low light) or in the absence of illumination (or in the absence of brightness), wherein these colors are identical or different and are chosen independently of one another. Thus, it is possible to have a day color (dye) that is different from the night color (luminescent pigment).

In the context of the present invention, low luminosity (or low illumination) and absence of luminosity (or absence of illumination) are understood to mean illuminances of less than 100 lx, even 10 lx or even less than 1 lx.

By "association" is meant an interaction, particularly intimate, between the luminescent pigment and the dye which avoids, when the colored luminescent pigment is rinsed with water, the removal of the dye as has been shown by the inventors.

Preferably, the composite pigment according to the invention comprises from 0.00001 to 99.99999% by weight of luminescent pigment and from 99.99999 to 0.00001% by weight of dye, preferably from 50 to 99.99% by weight of luminescent pigment and from 50 to 0.01% by weight of dye.

The present invention also relates to a process for preparing a colored luminescent composite pigment comprising the steps of:
   a) providing a composition comprising one or more dyes in a fluid;
   b) mixing with the composition of step a) at least one luminescent pigment;
   and
   c) drying the mixture obtained in step b).

Preferably, when the dye is non-soluble in the fluid, the composition of step a) is/are (a) dye suspension(s) in the fluid.

Preferably, the fluid is chosen from among water, alcohols (preferably ethanol) and acetone, or their mixture. Preferably the fluid is water and, in particular, purified water (by distillation or passage over an ion exchange resin) in order to avoid the appearance of whitish deposit on the colored luminescent pigment, and to limit the phenomena of prejudicial agglomeration.

The dye may be suspended or solubilized in the fluid by any means known to persons skilled in the art, in particular by mechanical means. Suspension may also be carried out in the presence of a surfactant-type dispersant or other polymers, for example acrylic polyacid, comb polymer, especially of the PCP type, structured polymer such as those described in patent application EP0877765.

The composition of step a) may optionally contain a wetting agent. Such wetting agents are described in particular in the reference: *The formulation of paints*, J. C. Laout, Ed. Engineering Techniques, page J 2 270-16 of 10 Sep. 2005.

Preferably, in the context of the present invention, the composition of step a) comprises from 0.0001 to 50%, preferably from 0.05 to 1%, more preferably from 0.1 to 0.5%, by weight of dye(s) relative to the total weight of the composition. This advantageously makes it possible to control the viscosity of the composition of step a).

Preferably, the Brookfield dynamic viscosity of the composition of step a), measured at 20° C., is less than 1000 mPa·s, preferably less than 100 mPa·s, in particular between about 1 mPa·s and 1000 mPa·s, preferably between about 1 mPa·s and about 100 mPa·s. The inventors have pointed out that the more the composition of step a) was viscous, the more the composite pigment was leachable with a loss of the dye, revealing a less effective association, or even a difference between the luminescent pigment and the dye at viscosities greater than 1000 mPa·s. Preferably, the composition of step a) is an aqueous dye composition.

Preferably, in step b), the luminescent pigment is as defined above.

Preferably, the amount of dye is chosen so that the loss of luminescence of the final colored luminescent pigment with respect to the luminescent pigment alone is not greater than 10% (loss measured according to NF X 08-050-1 and DIN 67510-1). Preferably, in step b), the mixture obtained comprises from 1 to 90%, preferably from 15 to 60%, more preferably from 25 to 35% by weight of luminescent pigment relative to the total weight of the mixture.

Additional additives, for example color enhancers or antioxidants, may be added during step b), especially in contents of 0.1% to 5% by weight relative to the weight of the mixture obtained in step b). Color enhancers may be chosen, in particular, from among fatty acids. The antioxidants may, in particular, be chosen from among phenol derivatives, aromatic secondary amines, quinones, amines of HALS (Hindered Amine Light Stabilizers) type.

Advantageously, the mixture of step b) is carried out for 30 seconds to 1 hour, preferably for 1 to 10 minutes. Stirring, in step b), should preferably not be shearing in order to avoid changing the size of the luminescent pigments and dyes. Stirring more than 10 minutes may risk breaking of the luminescent pigment and a risk of agglomeration. Stirring less than 1 minute may cause a less effective association between the luminescent pigment and the dye and thus a possible leaching of the composite pigment obtained.

Without wishing to be bound by any theory, during this step b) the dye is associated with the luminescent pigment to form the colored luminescent pigment. In order to improve the association between the dye and the luminescent pigment, step b) may be carried out in the presence of a binder. Among the binders that may be mentioned are latexes, epoxy resins, polyurethane resins. Advantageously, the composite pigment of the invention does not comprise a binder for fixing the luminescent pigment and the dye between them. Advantageously, the composite pigment of the invention does not comprise a silica layer.

The drying step c) may be carried out at room temperature (about 20 to 25° C.), however the temperature must be controlled in order not to degrade the luminescent pigments and dyes. Persons skilled in the art, in view of the luminescent pigments and dyes used, are able to determine the drying limit temperature. Preferably, the drying temperature is below 400° C.

The drying may be carried out by any method known to persons skilled in the art and, in particular, through static drying (for example drying in a fixed thin layer), atomizer, fluidized bed, etc.

Preferably, the drying step may be carried out under a gaseous flow, for example air flow, nitrogen . . . .

The drying step c) may also be carried out under vacuum. Advantageously, this reduces the drying time.

The method according to the present invention may comprise, before step c), a step b') of decanting the mixture obtained in step b) and of separating:

a solid phase comprising the composite pigment according to the invention which is then dried in step c) and;

a liquid phase comprising the dye which has not been associated with the luminescent pigment and which may be reused in the process of the invention as a composition of stage a).

The method for preparing the colored luminescent pigment according to the present invention may also comprise a step b"), before or after step c), and if necessary before or after step b'), of depositing a coating on the surface of the colored luminescent pigment. This step, which advantageously makes it possible to protect the colored luminescent pigment, in particular with respect to water, may be carried out hot or cold, in particular up to a temperature of 400° C., by any method known to those skilled in the art, such as spraying or quenching in a bath. The coating may be chosen by persons skilled in the art as a function of the application and the final material targeted. The coating may, in particular, be a polymeric coating (chosen in particular from among polyurethanes, epoxy resins, acrylic polymers, polyamides, polyesters, silicone resins, polyalkylenes or fluoropolymers) or a wax (chosen, in particular, from among those of natural origin such as carnauba wax or synthetic waxes such as paraffins). In this case, it is possible to coat the colored composite phosphor pigment of the invention by mixing this pigment in a composition comprising the polymer or resin or a monomer capable of polymerizing to form the desired polymer. Thus, if the composition of polymer, monomer or resin is a composition of the same type as the composition of step a) then step b") may be carried out before step b') and before step c).

The invention also relates to the colored luminescent pigment obtainable by the method according to the invention.

The colored luminescent pigment of the present invention may be introduced into a matrix, preferably transparent.

The present invention therefore relates to a luminescent composition (C) comprising a transparent matrix and a luminescent composite pigment according to the invention.

Preferably, the transparent matrix is, in particular, compatible with the alkaline pH of the hydraulic binder compositions, and is preferably chosen from among polymethyl methacrylate (PMMA), polycarbonate (PC), polyvinyl chloride (PVC), polyurethane (PU), styrene acrylonitrile (SAN) copolymers and their derivatives such as ABS (acrylonitrile/butadiene/styrene) or glass.

The luminescent composition (C) may be a liquid composition or a solid composition at room temperature (approximately 20 to 25° C.), i.e. the transparent matrix that it contains is either a transparent liquid matrix at ambient temperature or a transparent matrix that is solid at room temperature.

Advantageously, the luminescent composition (C) is a solid composition, wherein the solid transparent matrix, in particular, makes it possible to ensure durability and to avoid degradation, in particular through contact with water by the colored luminescent composite pigment.

The luminescent composition (C) may be obtained by dispersing the colored luminescent pigment obtained in step c) in a transparent liquid matrix solution or in a transparent liquid matrix capable of generating the solid transparent matrix, in particular by solidification, crosslinking or polymerization.

When the luminescent composition (C) is solid, it may be molded, wherein, for example, the mold may be filled by an injection press, or shaped by extrusion. Rotational molding techniques may also be implemented.

A "solution capable of generating the transparent matrix" is understood to mean the transparent matrix in the molten state (which may therefore generate the transparent matrix by solidification), or a solution comprising monomers capable of generating the transparent matrix by polymerization, or a solution comprising a pre-polymer capable of generating the transparent matrix by crosslinking.

Preferably, the solution capable of forming the transparent matrix is a solution of molten polymer or molten glass, preferably molten polymer. Advantageously, because of the high viscosity of the molten polymer, this makes it possible to avoid the settling of the composite pigment according to the invention and thus to obtain homogeneous compositions.

The luminescent composition according to the invention comprises from 0.001% to 99.999% by weight of luminescent composite pigment and 99.999% to 0.001% by weight of transparent matrix. Preferably, the luminescent composition comprises between 0.5% and 60% by weight of luminescent composite pigment and 99.5% and 40% of transparent matrix, and preferably between 5% and 50% of luminescent composite pigment and 95% and 50% by weight of transparent matrix.

The solid luminescent composition (C) obtained may be comminuted to form aggregates. The comminution may be carried out by any method known to persons skilled in the art as a function of the size of the desired aggregates.

The invention, therefore, also relates to an aggregate comprising a transparent matrix and a composite pigment according to the invention. Preferably, the aggregates have an average particle size of between approximately 0.1 and 125 mm (size measured according to the standards ISO 13320:2009 or NF EN 933-1 of May 2012). The mean particle size corresponds to the mean particle diameter.

In a particularly preferred manner, the transparent matrix is PMMA and the solution capable of forming the transparent matrix is a solution of molten PMMA. In a preferred embodiment, the mixture of molten PMMA and composite pigment according to the invention is poured into a mold, in particular using an injection molding machine. Preferably, after demolding, the composition (C) obtained is comminuted to obtain aggregates of the size desired.

In a particular embodiment, the process for preparing the composition (C) of the invention or an aggregate of the invention comprises the steps of:
1) providing a colored luminescent composite pigment according to the invention;
2) dispersing the colored luminescent composite pigment in a solution capable of forming the transparent matrix;
3) optionally shaping the dispersion obtained in step 2), in particular in a mold;
4) optionally solidifying the mixture obtained in step 2) or 3);
5) optionally comminuting the composition obtained in step 4) to obtain aggregates.

The method may comprise a step of preparing the colored luminescent composite pigment according to the invention before step 1), in particular the preparation method described above.

In a particularly preferred embodiment, the invention relates to a method for preparing a granulate according to the invention in which the transparent matrix is PMMA, comprises the steps of:
1) providing a colored luminescent composite pigment according to the invention;
2) dispersing the composite pigment in a solution of melted PMMA;
3) shaping the dispersion obtained in step 2) in a mold, in particular using an injection molding machine or by rotational molding;
4) solidification of the mixture obtained in step 3);
5) comminuting the composition obtained in step 4).

The method may comprise a step of preparing the colored luminescent composite pigment according to the invention before step 1), in particular the preparation method described above.

Advantageously, the composition (C) according to the invention, or the aggregate according to the invention, may also comprise additives, in particular additives of the flame retardant type, or additives that improve hardness, for example quartz.

These additives are preferably added during the preparation of the luminescent composition (C) or the aggregate, especially in the dispersion comprising the composite pigment of the invention and the solution capable of forming the transparent matrix.

The colored luminescent composite pigment and the luminescent composition (C) according to the present invention, optionally in the form of aggregates, may be used for coloring materials such as hydraulic binder compositions (plaster, concrete, mortar, screed), plastics, plaster, coatings, varnishes and paints, inks, paper and cardboard, cosmetic compositions, textiles, glasses, enamels, ceramics, tile adhesives, tile joints . . . .

The coloration with the colored luminescent pigment of the invention, the composition (C) of the invention or the aggregate of the invention may be made both in the mass and on the surface of the material to be colored. In the case of a surface application, the composite pigment according to the invention may be used:
in a two-component mixture comprising, on the one hand, the composite pigment, the composition (C) or the aggregate and, on the other hand, a binder, wherein the mixing of the two components is made just before application
in a one-component mixture comprising the composite pigment, the composition (C) or the aggregate dispersed in a binder, especially of the acrylic, epoxy, styrene-acrylic, silicate or polyurethane type.

The surface application may be by spraying, by deposition for example by a roller or with a brush, by pouring, by sprinkling (in particular dusting of the composite pigment on the surface of the material). When the composition (C) is liquid, it may be applied by spraying, by deposition, for example by a roller or by deposition on the surface of the material and crosslinking or polymerization to form a solid coating. Advantageously, for a surface application, the composite pigment may be dispersed in a solution of a monomer capable of polymerizing after deposition on the surface of the material.

Regarding the composition (C) or the aggregate, the surface application may be carried out, for example, by nailing (insertion of a composition (C) or an aggregate on the surface of the material before setting) . . . .

The invention also relates to a material comprising the colored luminescent composite pigment or the luminescent composition (C) or the aggregate according to the invention.

Preferably, the material is chosen from among hydraulic binder compositions (plaster, concrete, mortar, screed), plastics, varnishes and paints, coatings, coatings, inks, paper and paperboard, cosmetic compositions, textiles, glass, tile adhesives, tile joints . . . .

Preferably, the use of the composite pigment according to the invention, of the composition (C) according to the invention or of the aggregates according to the invention makes it possible to obtain materials of homogeneous color with good control of the color in light and in reduced brightness or in the absence of brightness, while reducing the required amount of dye compared to the usual techniques.

The present invention also relates to a coating comprising the colored luminescent composite pigment or the composition (C) or the aggregate according to the present invention. The coatings may, for example, be organic coatings, for example acrylic varnishes, or inorganic coatings, for example silicate paint. Coatings may also be obtained by a sol/gel method.

In a particularly preferred manner, the present invention relates to the use of composite pigments according to the invention and/or aggregates according to the invention for the coloring of hydraulic binder compositions, especially for the coloring of concrete.

The term "hydraulic binder" is understood to mean any compound having the property of hydrating in the presence of water and whose hydration makes it possible to obtain a solid having mechanical characteristics. The hydraulic binder may comprise or consist of a cement according to the standard EN 197-1 and, in particular, a cement of the CEM I, CEM II, CEM III, CEM IV or CEM V type according to the cement standard NF EN 197-1 (2012). The cement may therefore, in particular, comprise mineral additions.

The term "composition based on hydraulic binder" is understood to mean a composition comprising a hydraulic binder. It may be a composition based on fresh hydraulic binder, which then corresponds to a "hydraulic binder composition", or a composition based on hardened hydraulic binder, such as a concrete.

The hydraulic binder may also be a hydraulic binder based on calcium sulphate. The term "calcium sulfate-based hydraulic binders" according to the invention is understood to mean the hydraulic binders based on partially anhydrous or totally anhydrous calcium sulfate. This includes, in particular:

Gypsum or hydrated calcium sulphate: $CaSO_4 0.2(H_2O)$;
Calcium sulphate hemihydrate or calcium sulphate hemihydrate or partially anhydrous calcium sulphate: $CaSO_4 0.5H_2O$;
anhydrous calcium sulphate or anhydrite or totally anhydrous calcium sulphate: $CaSO_4$.

The term "fresh" is understood to mean those hydraulic binder-based compositions that have been tempered with water, but have not yet hardened. They are then malleable enough to fill the mold or formwork.

The term "hardened" is understood to mean such hydraulic binder-based compositions when hardened.

The term "setting" is understood to mean the transition to the solid state by hydration reaction of the binder.

The term "concrete" is understood to mean a mixture of hydraulic binders, aggregates, sands, water, optionally additives, and possibly mineral additions. The term "concrete" also includes mortars and screeds.

The term "mineral additions" refers to slags (as defined in the cement standard NF EN 197-1 (2012) section 5.2.2), steelmaking slags, pozzolanic materials (as defined in the cement standard NF EN 197-1 paragraph 5.2.3), fly ash (as defined in the cement standard NF EN 197-1 paragraph 5.2.4), calcined schists (as defined in the cement standard NF EN 197-1 paragraph 5.2.5), limestones (as defined in the cement standard NF EN 197-1 paragraph 5.2.6) or even fumes of silicas (as defined in the cement standard NF EN 197-1 paragraph 5.2.7) or their mixtures. Other additions, not currently recognized by the cement standard NF EN 197-1 (2012), may also be used. These include metakaolins, such as type A metakaolins conforming to standard NF P 18-513, and siliceous additions, such as the siliceous additions of mineralogy Qz in accordance with standard NF P 18-509 (2012).

The term "aggregates" is understood to mean a set of mineral grains of average diameter between 0 and 125 mm. Depending on their diameter, aggregates are classified into one of six families: fillers, sands, sand, gravels, chippings and ballast (standard XP P 18-545 of September 2011). The most widely used aggregates are: fillers, which have a diameter of less than 2 mm and for which at least 85% of the aggregates have a diameter of less than 1.25 mm and at least 70% of the aggregates have a diameter less than 0.063 mm, sands with a diameter between 0 and 4 mm (in standard 13-242, diameter up to 6 mm), sand with a diameter greater than 6.3 mm, gravel diameters between 2 and mm and 63 mm. Sands are therefore included in the definition of aggregate according to the invention. The fillers may, in particular, be of calcareous, siliceous or dolomitic origin.

The present invention also relates to hydraulic binder compositions, preferably concrete, comprising the colored luminescent composite pigment of the invention and/or the aggregates of the invention.

When the colored luminescent composite pigment is used, it may be introduced into the mass of the hydraulic composition, especially concrete, or on the surface of the hydraulic composition. For introduction into the mass, the composite pigment according to the invention may be added in premix with the standard aggregates and introduced to the kneading or directly individually introduced at the time of kneading. The quantities of composite pigment used depend on the color and, in particular, the intensity that is desired. In general, they correspond to the amounts usually used for conventional dyes, i.e. between 1 and 10% by weight of the hydraulic binder. For a surface application, the composite pigment of the invention may be sprinkled on the surface of the hydraulic binder composition before setting, or applied before or after setting dispersed in a composition of typical paint, varnish.

When the aggregates according to the invention are used, they may be used as a replacement for all or part of the aggregates typically used in hydraulic compositions, especially of the concrete type or in addition to the aggregates typically used. Aggregates may also be inserted into the concrete surface before setting.

The present invention will now be described with the aid of figures and non-limiting examples.

EXAMPLE 1

Figure 1:
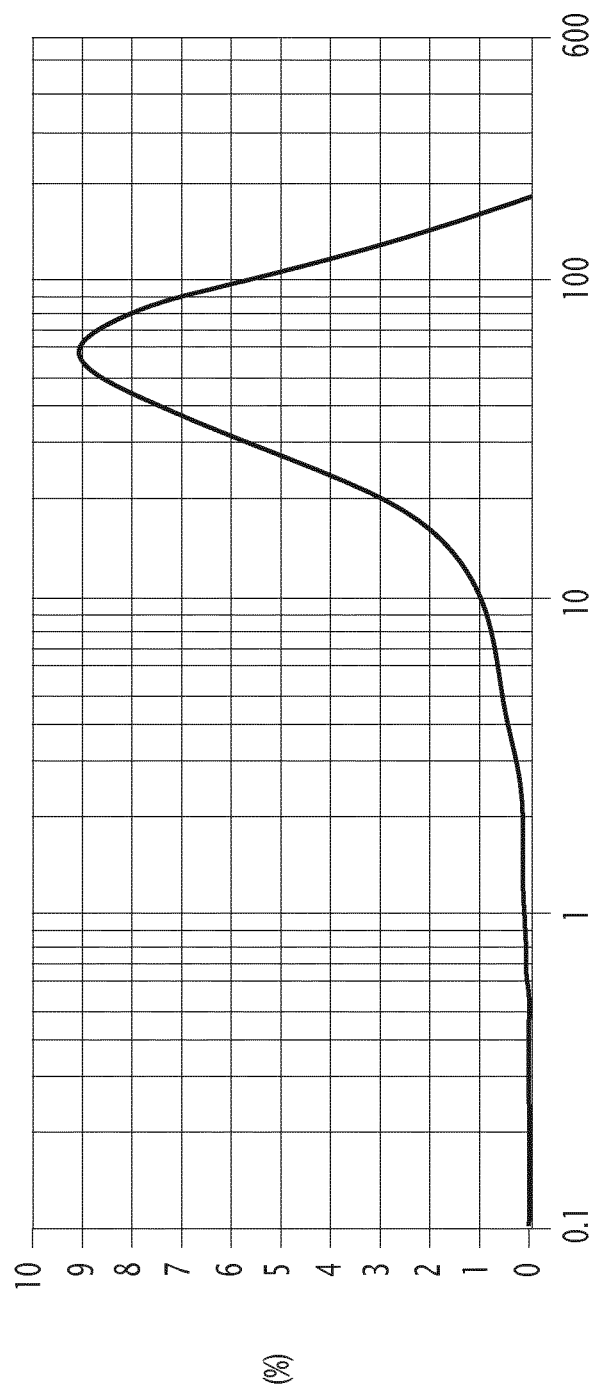
FIG. 1 shows the particle volume in vol. % versus particle size in μm and provides the particle size distribution measured by laser granulometry (Mastersizer 2000) (example 7).

3 g of yellow ocher dye (of the brand Universal Dye) are dispersed at 20° C. with stirring in 2 liters of softened water.

The 2 liters of dye suspension are then placed in a kneader.

1 kg of Realglow PYG 6LLL luminescent pigment emitting in yellow/green ($SrAl_2O_4$ doped Eu and Dy, particle size 400 μm) is poured in and kneaded for 3 minutes.

After stopping the stirring, the mixture decants rapidly and the decantate is spread on racks to a thickness of 2 to 3 cm. The rack is then placed for 4 hours in a chamber to be heated at 50° C. under a stream of hot air. The pigment is then in the form of a fluid powder that is not necessary to comminute. In daylight, the pigment has the beige color of the dye. In the dark, it emits a yellow/green light identical to that of the luminescent pigment.

The colored pigment is available to be incorporated in materials such as for example cementitious materials (mortar, concrete, screed, . . . ) or plastic materials (PMMA, . . . ), which after comminuting to the desired size, may be used as aggregates in concrete.

EXAMPLES 2 AND 3: THE IMPORTANCE OF HAVING AN UNTREATED LUMINESCENT PIGMENT

Two luminescent pigments A and B composed of strontium aluminate (yellow color in daylight, emitting in the blue in the dark, 350 μm particle size) are used. They differ only in the fact that A is untreated whereas B has been treated with polyethylene wax to give it better resistance to water and moisture. The colored pigments 2 and 3 are prepared according to the procedure of Example 1 from the compositions described in the table below:

|  | Example 2 | Example 3 |
| --- | --- | --- |
| Luminescent pigment A | 250 g |  |
| Luminescent pigment B |  | 250 g |
| Softened water | 500 g | 500 g |
| Blue pigment paste | 1 g | 1 g |

The pigment content of the paste is 60% by weight.

After drying according to the same procedure as in Example 1, the colored pigment of Example 2 is in the form of a homogeneous powder of blue color in daylight and emitting blue in the night. On the other hand, the colored pigment of Example 3 is not homogeneous, of generally less intense color, with the presence of dark blue agglomerates. This inhomogeneity is also sensitive when we look at the light emitted in the dark by the sample 3.

In addition, 5 g of each of these two pigments are placed while stirring in 1 liter of tap water. After about 5 minutes, the stirring is stopped. The pigment 2 decants leaving the water transparent. The pigment of Example 3 decants and leaves the water colored blue, indicating that the colored luminescent pigment of Example 3 would be very sensitive to leaching problems, which is detrimental in terms of durability. The comparison of these Example 2 samples shows the importance of having an untreated luminescent pigment in order to achieve an effective coloration.

EXAMPLE 4: IMPORTANCE OF GRANULOMETRY

Untreated luminescent pigments of the same chemical composition as that of Example 2 and variable particle sizes are used. They are mixed with the same blue pigment paste and according to the same procedure as in Example 2.

The brightness remanence is measured according to DIN 67510-1: 2009. The intensities at 10 and 60 min, as well as the extinction times (when the intensity falls below 0.3 mcd/m²). These data were measured for luminescent pigments before staining and estimated for the colored luminescent pigment. The unit cd is the candela which is the unit of measure of the luminous intensity.

|  | Luminescent pigment | | | Colored luminescent pigment | |
| --- | --- | --- | --- | --- | --- |
| Diameter (μm) | Intensity after 60 min (mcd/m²) | Intensity after 10 min (mcd/m²) | Extinction in min at 0.3 mcd/m² | Intensity after 60 min (mcd/m²) | Intensity after 10 min (mcd/m²) |
| 0.5 | 0.9 | 0 | 1 | 0.9 | 0 |
| 1 | 3 | 0 | 4 | 2.9 | 0 |
| 3 | 8 | 2 | 10 | 7.6 | 1.9 |
| 30 | 100 | 10 | 90 | 95 | 10 |
| 100 | 250 | 28 | 340 | 238 | 27 |
| 350 | 430 | 69 | 890 | 409 | 66 |
| 1000 | 590 | 89 | 1100 | 561 | 85 |

It emerges from these measurements that we have an interest in using pigments of large diameters, typically at least 30 μm. In fact, for finer pigments, the remanence lasts less than one hour, which is very short, especially for the applications covered by the present invention.

EXAMPLE 5: PHOTOLUMINESCENCE MEASUREMENT

This measurement is carried out according to the standards NF X 08-050-1 and DIN 67510-1.

The object is to measure the luminance ($mcd/m_2$) restituted by a composition (C) according to the invention after exposure under illumination produced by a Xenon arc.

The sample is a material consisting of 30 parts of composite luminescent pigment according to the invention and 100 parts of PMMA.

The luminous luminances restituted after 10, 60, 90, 480 and 900 mn after the source has been stopped are given in the following table:

| Restitution at 10 min (mcd/m²) | Restitution at 60 min (mcd/m²) | Restitution at 90 min (mcd/m²) | Restitution at 480 min (mcd/m²) | Restitution at 900 min (mcd/m²) |
| --- | --- | --- | --- | --- |
| 103.7 ± 0.1 | 20.2 ± 0.1 | 13.2 ± 0.1 | 1.7 ± 0.1 | 0.6 ± 0.1 |

The maximum luminance re-emitted by the sample after 5 minutes of illumination under 1000 lux is about 868 mcd/m². In view of the restitution at 60 min, this places the material in Class A of NF X 08-050-1.

The results therefore show a significant remanence of the composite pigments of the invention.

EXAMPLE 6: CHARACTERIZATION OF PERFORMANCE ON MORTAR

The flexural and compressive strengths according to NF EN 196-1 and the setting time (TP) according to NF EN 480-2 of a mortar composition in which 30% of the AFNOR sand was substituted by a luminescent granulate of size 0/2 (average diameter between 0 and 2 mm) according to the invention. The AFNOR sand is a standardized sand with a grain size between 0 and 2 mm (determined by sieving and complies with the requirements of EN 196-1 (2006) and ISO 679 (2009).

Mortar composition (with AFNOR sand substituted by 30% by weight with a 0/2 luminescent material)

| CEM I 52.5N Saint Pierre La Cour | 450 g |
|---|---|
| AFNOR sand | 945 g |
| Luminescent material 0/2 | 405 g |
| Water | 225 g |

The start time (DP), end of setting (FP) and total setting time (TP) are grouped in the table below:

| | Time (mn) |
|---|---|
| DP | 195 |
| FP | 380 |
| TP | 185 |

These results show that the replacement of a portion of the typical aggregates with aggregates according to the invention does not delay the setting of the hydraulic composition.

The results of the compressive and flexural strengths are shown in the tables below:

| Period | Resistance to compression (Mpa) |
|---|---|
| 24 h | 17 |
| 7 days | 37 |
| 28 days | 48 |

| Period | Resistance to flexion (Mpa) |
|---|---|
| 24 h | 4 |
| 7 days | 6 |
| 28 days | 7 |

These results show that the replacement of a portion of the typical aggregates with aggregates according to the invention has no detrimental influence on the strengths of the mortar compositions obtained.

EXAMPLE 7: CHARACTERIZATION OF LUMINESCENT PIGMENT SIZE

The particle size of a luminescent pigment obtained according to Example 1 was determined by laser granulometry (Mastersizer 2000).

FIG. 1 shows the particle size distribution in volume.
Ordinate: Volume (%)
Abscissa: Size (μm)
The luminescent powder has the following profile provided in FIG. 1 according to a volume distribution:
D10: 14.6 μm
D50: 50.5 μm
D90: 105.6 μm

EXAMPLE 8: CHARACTERIZATION OF THE GRANULOMETRY OF LUMINESCENT AGGREGATES

Figure 2:
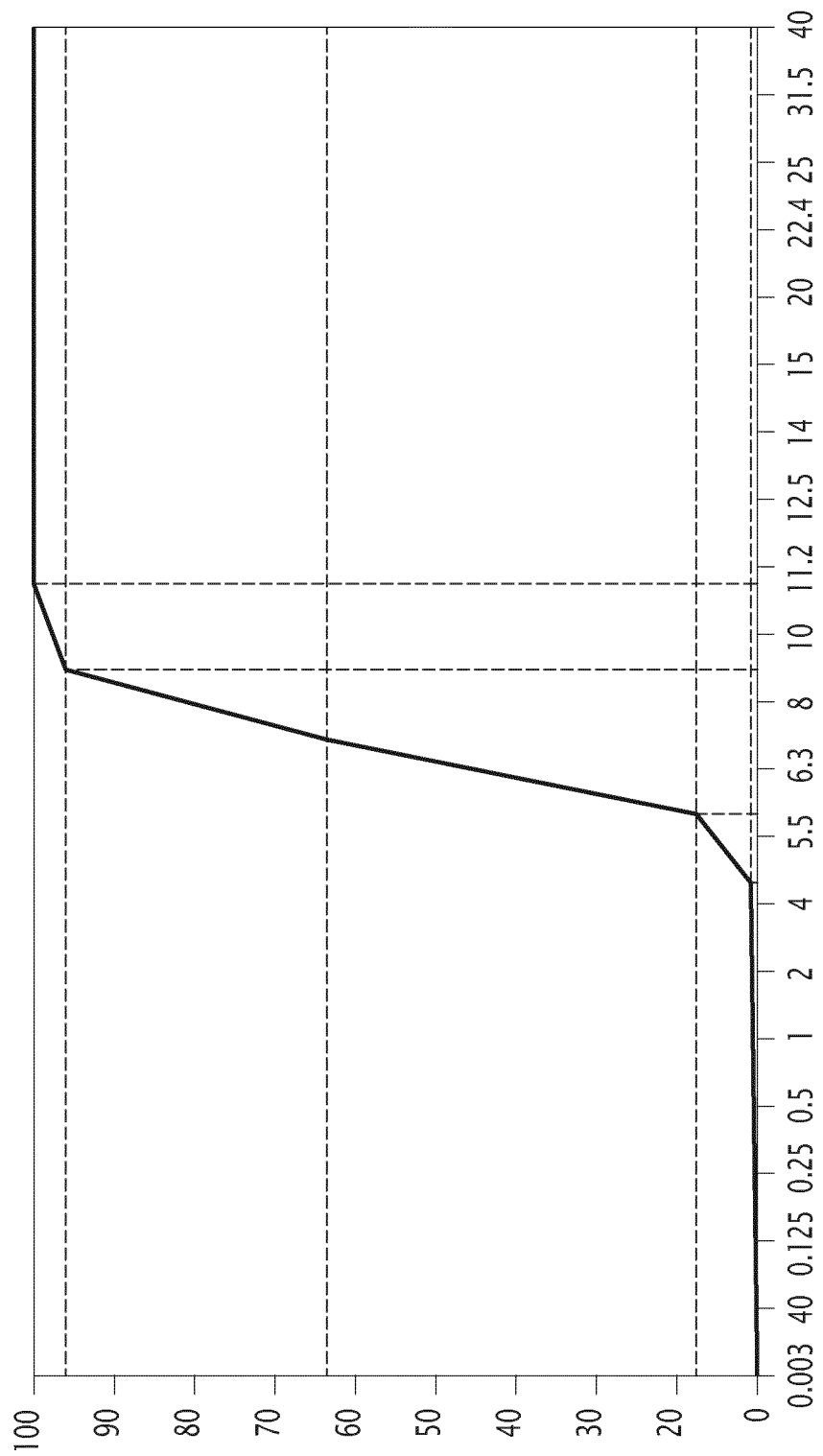
FIG. 2 shows the granulometric curve of the aggregates according to the standards NF EN 933-1 and NF EN 933-2 (example 8).

The granulometry of the aggregates of size 6/10 comprising 20 parts of luminescent pigment and 100 parts of PMMA was determined according to the standards NF EN 933-1 and NF EN 933-2 and is provided in FIG. 2.

FIG. 2 shows a grain size curve representing the cumulative percentage by weight of sieve (mm).

The invention claimed is:

1. A colored luminescent composite pigment consisting of particles of one or more luminescent pigment and particles of one or more dye that is different than said one or more luminescent pigment, said colored luminescent composite pigment having an average particle size of between about 50 and about 2000 μm, wherein the color of the luminescent pigment and the dye are different, and wherein the particles of one or more luminescent pigment and the particles of one or more dye are in intimate association such that washing of the colored luminescent composite pigment with water does not cause leaching of the one or more dye.

2. Pigment according to claim 1, wherein the average size of the luminescent pigment particles is between about 50 and about 2000 μm.

3. Pigment according to claim 1, wherein the dye has a particle size of 0.1 to 10 μm.

4. Method for preparing a colored luminescent composite pigment comprising the steps of:
   a) providing a composition of one or more dyes as defined in claim 1 in a fluid;
   b) mixing with the composition of step a) at least one luminescent pigment as defined in claim 1; and
   c) drying the mixture obtained in step b) to obtain a colored luminescent composite pigment according to claim 1.

5. Method according to claim 4 comprising a step b"), before or after step c), of depositing a coating on the mixture obtained in step c).

6. Colored luminescent composite pigment produced by the method according to claim 4.

7. Colored luminescent composition comprising a transparent matrix and at least one colored luminescent composite pigment according to claim 1.

8. Aggregate comprising a transparent matrix and at least one colored luminescent composite pigment according to claim 1.

9. Composition or aggregate according to claim 7, wherein the transparent matrix is chosen from polymethyl methacrylate (PMMA), polycarbonate (PC), polyvinyl chloride (PVC), polyurethane (PU), copolymers styrene acrylonitrile (SAN) and their derivatives and glass.

10. Aggregate according to claim 9 for which the transparent matrix is PMMA.

11. Method for preparing a composition according to claim 7, comprising the steps of:
   1) providing a colored luminescent composite pigment;
   2) dispersion of the composite pigment in a liquid capable of forming the transparent matrix;
   3) optionally shaping the dispersion obtained in step 2), in a mold;
   4) optionally solidifying the mixture obtained in step 2) or 3);
   5) optionally comminuting the composition obtained in step 4) to obtain aggregates.

12. Preparation method according to claim 11, comprising the step 3) of shaping the dispersion obtained in step 2), in a mold.

13. Method according to claim 11 for preparing a granulate, wherein the transparent matrix is PMMA, comprising the steps of:
   1) providing a colored luminescent composite pigment according to claim 1;

2) dispersion of the composite pigment in a solution of melted PMMA;
3) shaping the dispersion obtained in step 2) in a mold, using an injection molding machine or by rotational molding;
4) solidification of the mixture obtained in step 3);
5) comminuting the composition obtained in step 4).

14. A hydraulic binder composition comprising the colored luminescent composite pigment according to claim 1.

15. Material comprising a colored luminescent composite pigment according to claim 1, wherein the material is a hydraulic binder composition, a plastic, a varnish, a paint, a plaster, a coating, an ink, paper, cardboard, a cosmetic composition, a glass, a ceramic, an enamel, a textiles, tile adhesives, or tile joints.

16. Coating comprising a colored luminescent composite pigment according to claim 1.

17. Composition of hydraulic binder comprising a colored luminescent composite pigment according to claim 1.

18. Method for preparing an aggregate according to claim 8, comprising the steps of:
1) providing the colored luminescent composite pigment;
2) dispersion of the composite pigment in a liquid capable of forming the transparent matrix;
3) optionally shaping the dispersion obtained in step 2), in a mold;
4) optionally solidifying the mixture obtained in step 2) or 3);
5) optionally comminuting the composition obtained in step 4) to obtain aggregates.

19. A hydraulic binder composition comprising the colored luminescent composition according to claim 7.

20. A hydraulic binder composition comprising the aggregate according to claim 8.

* * * * *